United States Patent
Luo et al.

(10) Patent No.: US 12,487,652 B2
(45) Date of Patent: Dec. 2, 2025

(54) CPU PERFORMANCE ADJUSTMENT METHOD AND APPARATUS, AND MEDIUM

(71) Applicant: INSPUR SUZHOU INTELLIGENT TECHNOLOGY CO., LTD., Jiangsu (CN)

(72) Inventors: Siheng Luo, Jiangsu (CN); Cai Kong, Jiangsu (CN); Ziqiu Feng, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/280,222

(22) PCT Filed: Jan. 28, 2022

(86) PCT No.: PCT/CN2022/074608
§ 371 (c)(1),
(2) Date: Sep. 2, 2023

(87) PCT Pub. No.: WO2023/045200
PCT Pub. Date: Mar. 30, 2023

(65) Prior Publication Data
US 2024/0152191 A1    May 9, 2024

(30) Foreign Application Priority Data

Sep. 27, 2021 (CN) .......................... 202111132410.8

(51) Int. Cl.
*G06F 1/26* (2006.01)
*G06F 1/3206* (2019.01)
(Continued)

(52) U.S. Cl.
CPC .............. *G06F 1/3206* (2013.01); *G06F 1/26* (2013.01); *G06F 1/263* (2013.01); *G06F 1/3243* (2013.01); *G06F 1/3296* (2013.01)

(58) Field of Classification Search
CPC ... G06F 1/26; G06F 1/263; G06F 1/32; G06F 1/3203; G06F 1/3206; G06F 1/3234; G06F 1/324; G06F 1/3243; G06F 1/3296
See application file for complete search history.

(56) References Cited

U.S. PATENT DOCUMENTS

| | | | |
|---|---|---|---|
| 7,519,843 B1 | 4/2009 | Buterbaugh et al. | |
| 2014/0208136 A1* | 7/2014 | Rahardjo | G06F 1/00 713/320 |
| 2022/0300064 A1* | 9/2022 | Chen | G06F 1/3243 |

FOREIGN PATENT DOCUMENTS

| CN | 102541239 A | 7/2012 |
|---|---|---|
| CN | 107678855 A | 2/2018 |

(Continued)

*Primary Examiner* — Douglas X Rodriguez
*Assistant Examiner* — Kendrick X Liu
(74) *Attorney, Agent, or Firm* — IPro, PLLC

(57) ABSTRACT

The present application discloses a CPU performance adjustment method and apparatus, and a medium. The method includes: determining, by a baseboard management controller (BMC), a rated power of a power supply unit (PSU) powering a current central processing unit (CPU); outputting, by a complex programmable logic device (CPLD), a control signal corresponding to the rated power; outputting, by a preset conversion unit, a voltage value corresponding to the control signal; and determining, based on the voltage value and a first preset mapping relationship, a maximum operating frequency of the CPU in an overclocking state, the first preset mapping relationship is a corresponding relationship between voltage ranges and maximum operating frequencies.

18 Claims, 5 Drawing Sheets

(51) Int. Cl.
*G06F 1/3234* (2019.01)
*G06F 1/324* (2019.01)
*G06F 1/3296* (2019.01)

(56) References Cited

FOREIGN PATENT DOCUMENTS

| | | |
|---|---|---|
| CN | 111475009 A | 7/2020 |
| CN | 112667470 A | 4/2021 |
| CN | 113157076 A | 7/2021 |
| CN | 113589913 A | 11/2021 |
| TW | 201224728 A | 6/2012 |

* cited by examiner

CPU PERFORMANCE ADJUSTMENT METHOD AND APPARATUS, AND MEDIUM

CROSS-REFERENCE TO RELATED APPLICATION

The present disclosure claims priority to Chinese patent application No. 202111132410.8, titled "CPU PERFORMANCE ADJUSTMENT METHOD AND APPARATUS, AND MEDIUM", filed on Sep. 27, 2021 before the China National Intellectual Property Administration, which is incorporated herein in its entirety by reference.

TECHNICAL FIELD

The present disclosure relates to the technical field of power supply reliability design, and in particular to a central processing unit (CPU) performance adjustment method and apparatus, and a medium.

BACKGROUND

With the rise of cloud computing technology, internet traffic is continuously increasing. A higher requirement is proposed on the data processing capacity and storage capacity of the computer room server. As a unit in a traditional computer room, a cabinet system requires server computing nodes deployed inside the cabinet to have increasingly strong data processing capacity and increasingly high density. With the growth of Internet user services, network data throughput is increasing, and the workload of servers, which are basic data processing units of the data center, is also increasing. In particular, a central processing unit (CPU) chip inside the server operates at higher and higher load currents up to 100 to 550 A. In the actual development process of a server product, consideration is based on tradeoff of the design cost and the performance of the product. For applications with low computational performance requirements, low-power power supply unit (PSU) is usually used to adapt to low-configuration server products, and high-power PSU is used to adapt to high-configuration server products.

SUMMARY

In view of the above, an object of the present disclosure is to provide a central processing unit (CPU) performance adjustment method and apparatus, and a medium. The detail solution is as follows.

In a first aspect, the present application provides a central processing unit (CPU) performance adjustment method, including:
  determining, by a baseboard management controller (BMC), a rated power of a power supply unit (PSU) powering a current central processing unit (CPU);
  outputting, by a complex programmable logic device (CPLD), a control signal corresponding to the rated power;
  outputting, by a preset conversion unit, a voltage value corresponding to the control signal; and
  determining, based on the voltage value and a first preset mapping relationship, a maximum operating frequency of the CPU in an overclocking state,
  where the first preset mapping relationship is a corresponding relationship between voltage ranges and maximum operating frequencies.

In some embodiments, the determining, by a baseboard management controller (BMC), a rated power of a power supply unit (PSU) powering a current central processing unit (CPU) includes:
  reading, by the BMC, a product model of the PSU powering the current CPU from a memory of the PSU; and
  determining the rated power of the PSU based on the product model.

In some embodiments, the central processing unit (CPU) performance adjustment method further includes:
  generating, based on a second preset mapping relationship, a target encoded signal corresponding to the rated power by the BMC, wherein the second preset mapping relationship is a corresponding relationship between different rated powers and different encoded signals;
  the outputting, by a complex programmable logic device (CPLD), a control signal corresponding to the rated power includes:
  inputting the target encoded signal into the CPLD, and outputting a control signal corresponding to the target encoded signal by the CPLD.

In some embodiments, the outputting, by a complex programmable logic device (CPLD), a control signal corresponding to the rated power includes:
  determining, by the CPLD, the rated power corresponding to the target encoded signal, and outputting the control signal corresponding to the rated power based on a third preset mapping relationship; the third preset mapping relationship is a corresponding relationship between different rated powers and different control signals.

In some embodiments, the outputting, by a preset conversion unit, a voltage value corresponding to the control signal includes:
  controlling, based on the control signal, a metal-oxide-semiconductor field-effect transistor (MOS) in a target branch of the preset conversion unit to turn on, and obtaining the voltage value corresponding to the control signal by performing a voltage division on a reference voltage using a divider resistor on the target branch; the reference voltage is a voltage converted from a supply voltage of the PSU, and resistance values of the divider resistors in different branches of the preset conversion unit are different, and the target branch is one branch of the preset conversion unit.

In some embodiments, the determining, based on the voltage value and a first preset mapping relationship, a maximum operating frequency of the CPU in an overclocking state includes:
  performing an analogue-to-digital (AD) conversion on the voltage value to obtain a corresponding conversion value; and
  determining the maximum operating frequency of the CPU in the overclocking state based on the conversion value and the first preset mapping relationship.

In some embodiments, the determining the maximum operating frequency of the CPU in the overclocking state based on the conversion value and the first preset mapping relationship includes:
  obtaining a target voltage range by determining a voltage range to which the conversion value belongs; and
  obtaining the maximum operating frequency of the CPU in the overclocking state by determining the maximum operating frequency corresponding to the target voltage range based on the first preset mapping relationship.

In a third aspect, the present application provides a central processing unit (CPU) performance adjustment apparatus, including:
- a baseboard management controller (BMC), configured to determine a rated power of a power supply unit (PSU) powering a current central processing unit (CPU);
- a complex programmable logic device (CPLD), configured to output a control signal corresponding to the rated power;
- a preset conversion unit, configured to output a voltage value corresponding to the control signal; and
- a maximum operating frequency determination module, configured to determine, based on the voltage value and a first preset mapping relationship, a maximum operating frequency of the CPU in an overclocking state, where the first preset mapping relationship is a corresponding relationship between voltage ranges and maximum operating frequencies.

In some embodiments, the maximum operating frequency determination module includes:
- a CPU voltage regulator, configured to perform an analogue-to-digital (AD) conversion on the voltage value to obtain a corresponding conversion value; and
- a central processing unit (CPU), configured to determine the maximum operating frequency of the CPU in the overclocking state based on the conversion value and the first preset mapping relationship.

In a fourth aspect, the present application provides a computer-readable storage medium for storing a computer program that, when executed by a processor, implements the CPU performance adjustment method described above.

BRIEF DESCRIPTION OF THE DRAWINGS

In order to more clearly illustrate technical solutions of embodiments of the present disclosure or the related art, the figures that are required to describe the embodiments or the related art will be briefly introduced below. Apparently, the figures that are described below are embodiments of the present disclosure, and those skilled in the art may obtain other figures according to these figures without paying creative work.

DETAILED DESCRIPTION

The technical solutions in the embodiments of the present disclosure will be described clearly and thoroughly below in conjunction with the accompanying drawings in the embodiments of the present disclosure. Apparently, the described embodiments are only part of the embodiments of the present disclosure, not all of them. Based on the embodiments in the present disclosure, all other embodiments obtained by those skilled in the art without paying creative work belong to the scope of protection in the present disclosure.

Currently, some users will upgrade and reconfigure a server product according to their own business scenario after purchasing the server product. If the product is upgraded to high-power-consumption CPU without adjusting the PSU model accordingly, when the CPU is switched to a performance acceleration operation mode (overclocking), the overpower protection of the PSU will be triggered probabilistically, resulting in a risk of downtime. Some users will set a power threshold of the PSU in the baseboard management controller (BMC) of the system. When the CPU is in the overclocking, the system power is too high and the threshold is triggered, then the PSU will send an alert signal to control the CPU to underclock, so as to overcome the downtime problem. However, a period of processing time is generally required from a high system power value being monitored by the BMC, responding and processing, until triggering the CPU to underclock. During this period of time, some services handled by the CPU will be in a stagnant state, which will affect the service processing on a user side. Therefore, some users will select the high-power PSU to adapt the server so as to avoid affecting user-side services, which will bring an overall rise in the product cost.

Figure 1:
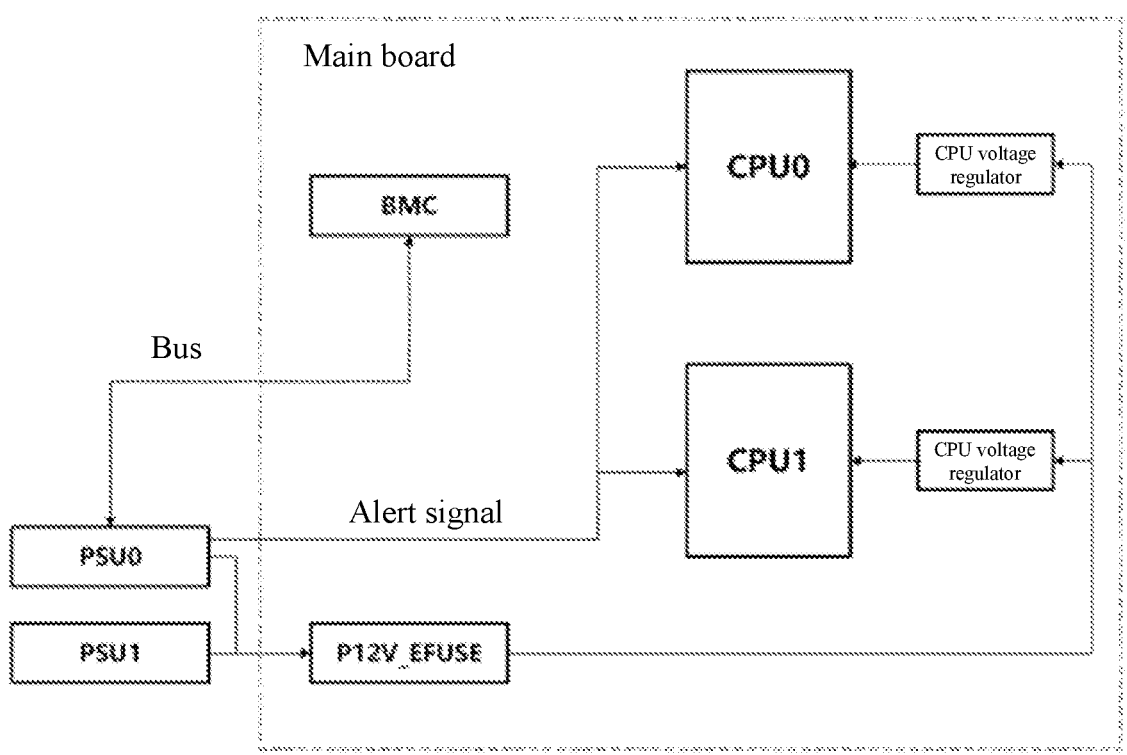
FIG. 1 is a schematic diagram of a power supply structure for a central processing unit (CPU) of an existing main board.

With reference to FIG. 1, FIG. 1 is a schematic diagram of a power supply structure for a central processing unit (CPU) of an existing main board provided in an embodiment of the present disclosure. The power supply structure includes: 1+1 redundant power supply units PSU0 and PSU1, a baseboard management controller (BMC), P12V_EFUSE (EFUSE, i.e. electronic fuse), which is a 12V load switch with over-current protection, CPU voltage regulators, CPU0, and CPU1. The operating principle is as follows: PSU0 and PSU1 are combined into a 1+1 redundant power supply to output P12V_PSU (voltage); P12V_PSU is directly supplied to the main board to output P12V through P12V_EFUSE, and P12V is converted by the CPU voltage regulator to supply power for the CPU. The BMC communicates with the PSU via a power management bus (PM-BUS), thereby monitoring a power consumption of a whole machine of the server system. Moreover, a power monitoring unit of the PSU may set a power consumption threshold to realize a system power limit and adjustment strategy. In other words, when the CPU is overclocking, a power consumption monitoring module of the PSU will send an alert signal to trigger the CPU to underclock if the system power consumption exceeds the power threshold. The PMBUS is an interaction bus for communication between the BMC and the PSU, thereby realizing the monitoring and management of an operating state of the PSU (including: voltage, current, power consumption, temperature, etc.). The alert signal sent by the PSU is used to realize a power limit of the PSU, and control the CPU to underclock. The disadvantage of the related art lies in that: when the main board is equipped with a high-specification CPU, in an overclocking operation state, there is a risk of triggering the PSU to be powered down or triggering the CPU to underclock, which affects the service processing of the end user; if the high-power PSU is selected to support high-specification CPU and ensure overclocking performance, the overall cost of the product will increase although the performance requirements can be met, which reduces the market competitiveness of the product. In view of this, the present disclosure provides a CPU performance adjustment solution that can avoid the problem that, when being in the overclocking operation state, the CPU triggers the over-power protection on the PSU or triggers the CPU to underclock, so that the service processing of an end user is affected, and can avoid the cost rise.

Figure 2:
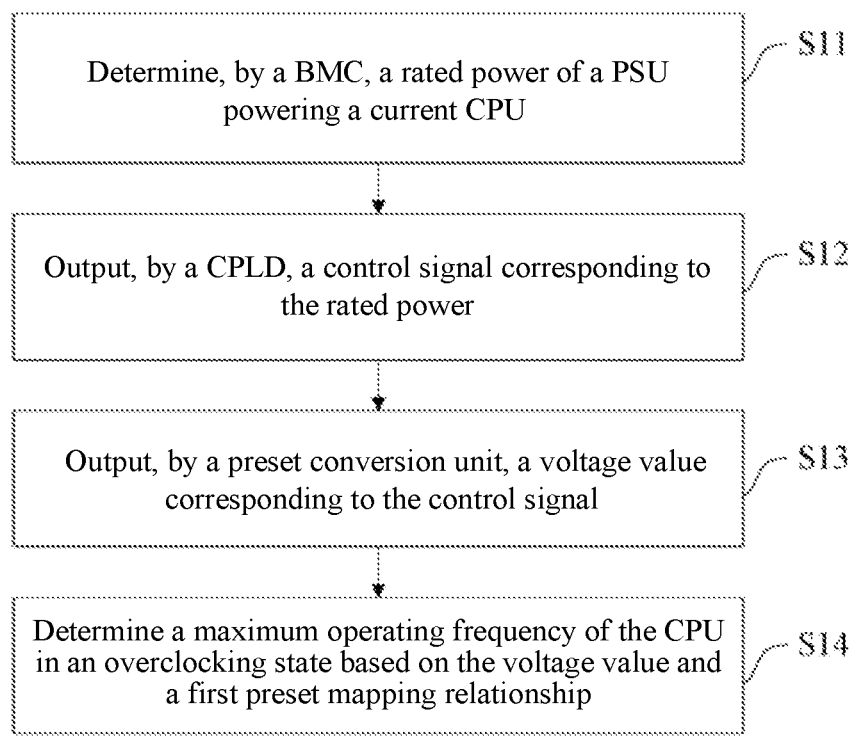
FIG. 2 is a flow chart of a CPU performance adjustment method disclosed in the present disclosure.

With reference to FIG. 2, an embodiment of the present disclosure discloses a central processing unit (CPU) performance adjustment method. The method includes steps described below.

At step S11, a rated power of a power supply unit (PSU) powering a current central processing unit (CPU) is determined by a baseboard management controller (BMC).

In a specific implementation, the BMC may read a product model of the PSU for powering the current CPU from a memory of the PSU; and the rated power of the PSU is determined according to the product model.

The memory may be a processor information ROM (PIROM) (that is, a product information memory) unit. The BMC accesses data in the PIROM storage unit of the PSU via the PMBUS, thereby obtaining a product model of the PSU.

At step S12, a control signal corresponding to the rated power is output by a complex programmable logic device (CPLD).

In a specific implementation, a target encoded signal corresponding to the rated power is generated by the BMC based on a second preset mapping relationship that is a corresponding relationship between different rated powers and different encoded signals; the target encoded signal is input into the CPLD, and a control signal corresponding to the target encoded signal is output by the CPLD.

For example, according to the rated power corresponding to the model of the PSU, the BMC generates a corresponding encoded signal A (Am, . . . , A2, A1), and a value of m is determined by a quantity of rated power types corresponding to the PSU powering a server product system. For example, the PSU powering the server product system adopts four power values P1, P2, P3 and P4, the corresponding relationship between the signal A and the power value of the PSU, namely, the second mapping relationship, is as shown in table 1 below:

TABLE 1

| Signal | A2 | A1 | P_PSU |
|---|---|---|---|
| Signal A | L | L | P1 |
|  | L | H | P2 |
|  | H | L | P3 |
|  | H | H | P4 |

In a specific implementation, the BMC encodes the rated power P_PSU of the PSU, and generates the encoded signal A which is fed back to the CPLD via an I2C bus.

Furthermore, in a specific implementation, the CPLD may determine a rated power corresponding to the target encoded signal, and output a control signal corresponding to the rated power according to a third preset mapping relationship, where the third mapping relationship is a corresponding relationship between different rated powers and different control signals.

Of course, in other embodiments, a control signal corresponding to the encoded signal can be output according to a fourth preset mapping relationship, where the fourth mapping relationship is a corresponding relationship between different encoded signals and different control signals.

At step S13, a voltage value corresponding to the control signal is output by a preset conversion unit.

In a specific implementation, a metal-oxide-semiconductor field-effect transistor (MOS) in a target branch in the preset conversion unit may be controlled to be turned on according to the control signal, and a resistive divider on the target branch is used to divide a reference voltage so as to obtain a voltage value corresponding to the control signal. The reference voltage is a voltage obtained by converting a supply voltage of the PSU, and resistance values of the resistive dividers in different branches of the preset conversion unit are different, and the target branch is one branch of the preset conversion unit.

That is, the CPLD is used to convert the coded signal A into the control signal B through a logic processing, thereby controlling an output voltage value of the conversion unit.

Figure 3:
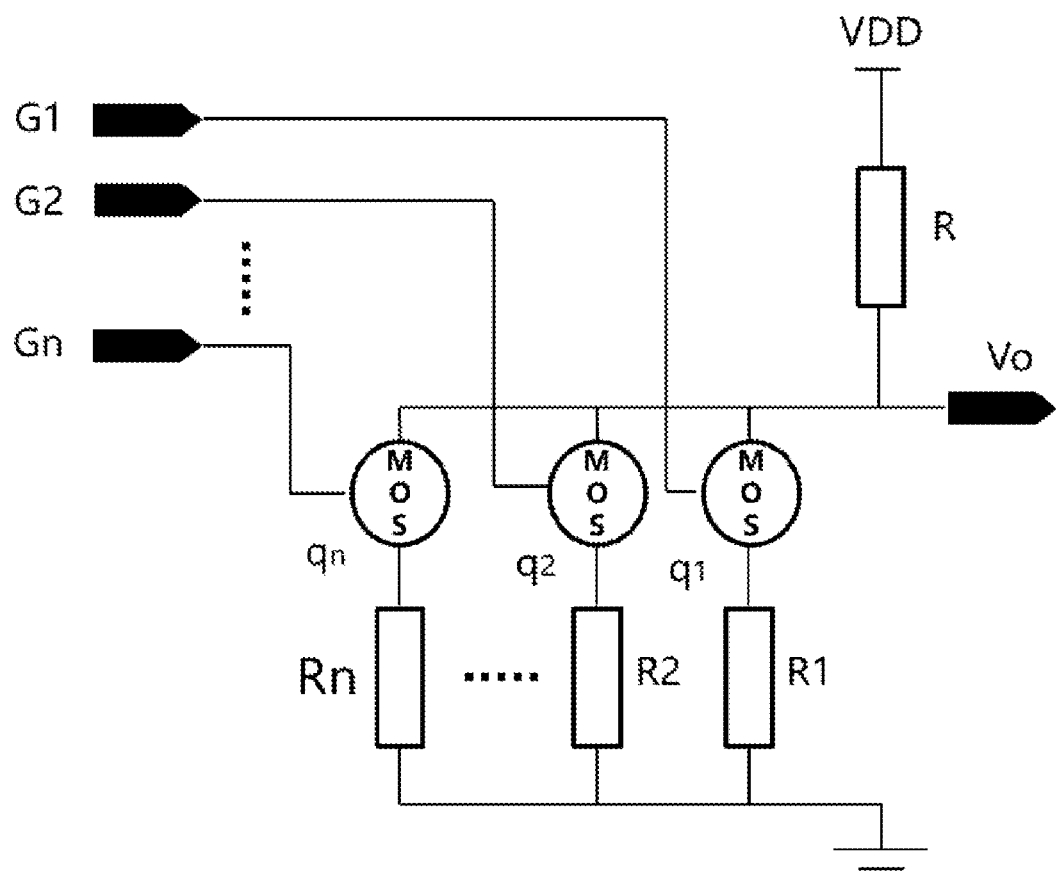
FIG. 3 is a structural diagram of a specific preset conversion unit disclosed in the present disclosure.

With reference to FIG. 3, FIG. 3 is a structural diagram of a specific preset conversion unit disclosed in an embodiment of the present disclosure. The preset conversion unit is composed of divider resistors and MOSs. The preset conversion unit is configured to control a corresponding MOS (q1, q2, . . . , qn) to be turned on according to a control signal sent from the CPLD, and the voltage division of VDD is performed on R and Ri (i=1, 2, . . . n) to obtain different output voltages Vo. The voltage value is calculated through the following formula:

$$Vo = VDD * Ri / (R + Ri)$$

where VDD is a reference voltage, R is a preset resistance and Ri is a divider resistor.

Here, for the control signals B (Gn, . . . G2, G1) sent from the CPLD, taking n=4 as an example, it is similar to a 4-bit digital selector. Four level signals include high levels and low levels. Moreover, only one bit of the 4-bit signal output at each time is a high level "H", and the other bits are low levels "L". The high level "H" turns on the MOS on a corresponding branch, so that the divider resistor on the branch participates in voltage division, and the MOSs on other branches do not turn on so that the divider resistors on other branches do not participate in voltage division. Each set of control signals corresponds to a PSU power value P_PSU (P1, P2, P3, P4), which corresponds to output voltage Vo (V1, V2, V3, V4). With reference to Table 2, Table 2 includes the corresponding relationship among the rated power, the control signal B and the voltage value. The corresponding relationship between the rated power and the control signal B is a specific situation of the third preset mapping relationship.

TABLE 2

| Signal | G4 | G3 | G2 | G1 | P_PSU | Vo |
|---|---|---|---|---|---|---|
| Signal B | H | L | L | L | P4 | V4 |
|  | L | H | L | L | P3 | V3 |
|  | L | L | H | L | P2 | V2 |
|  | L | L | L | H | P1 | V1 |

At step S14, a maximum operating frequency of the CPU in an overclocking state is determined based on the voltage value and a first preset mapping relationship.

The first preset mapping relationship is a corresponding relationship between voltage ranges and maximum operating frequencies.

In a specific implementation, an analogue-to-digital (AD) conversion is performed on the voltage value to obtain a corresponding conversion value; and the maximum operating frequency of the CPU in the overclocking state is determined based on the conversion value and the first preset mapping relationship.

Further, a voltage range to which the conversion value belongs is determined, and a target voltage range is obtained; and the maximum operating frequency corresponding to the target voltage range is determined based on the first preset mapping relationship, and the maximum operating frequency of the CPU in the overclocking state is obtained.

In a specific implementation, after receiving a Vo signal, a CPU voltage regulator (VR) chip will perform AD conversion on the Vo voltage value, and then transfer the AD conversion value to a power control unit (PCU) of the CPU via a serial voltage identification (SVID) bus. The CPU will determine the operating frequency based on the corresponding relationship in Table 3 below. V_ADC is the AD conversion voltage value corresponding to Vo, V_ADC_L and V_ADC_H are respectively upper and lower voltage thresholds of the voltage range, and F_CPU is the maximum operating frequency in the overclocking state set by the CPU.

If the detected conversion voltage value met V1_L<V_ADC≤V1_H, the CPU will set the maximum operating frequency in the overclocking state as f1; if the detected conversion voltage value met V2_L<V_ADC≤V2_H, the CPU will set the maximum operating frequency in the overclocking state as f2; if the detected conversion voltage value met V3_L<V_ADC≤V3_H, the CPU will set the maximum operating frequency in the overclocking state as f3; if the detected transition voltage value met V4_L<V_ADC≤V4_H, the CPU will set the maximum operating frequency in the overclocking state as f4.

TABLE 3

| Signal | Vo | $V_{ADC}$ | $V_{ADC\_L}$ | $V_{ADC\_H}$ | $F_{CPU}$ |
|---|---|---|---|---|---|
| Corresponding relationship | V1 | $V1_{ADC}$ | $V1_L$ | $V1_H$ | f1 |
| | V2 | $V2_{ADC}$ | $V2_L$ | $V2_H$ | f2 |
| | V3 | $V3_{ADC}$ | $V3_L$ | $V3_H$ | f3 |
| | V4 | $V4_{ADC}$ | $V4_L$ | $V4_H$ | f4 |

Figure 4:
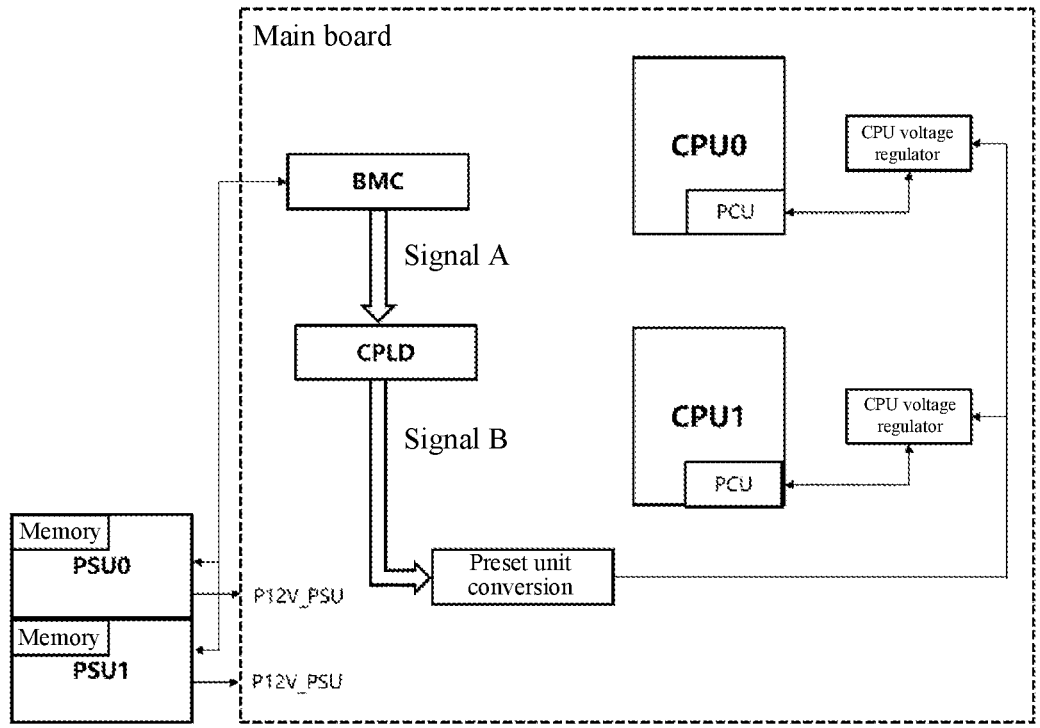
FIG. 4 is a schematic diagram of a specific power supply structure for adaptively adjusting CPU performance according to different models of power supply units (PSU) disclosed in the present disclosure.

With reference to FIG. 4, FIG. 4 is a schematic diagram of a specific power supply structure for adaptively adjusting CPU performance according to different models of power supply units (PSU) disclosed in an embodiment of the present disclosure. The power supply structure mainly includes: 1+1 redundant power supply units PSU0 and PSU1 for powering (that output P12V_PSU to power the main board), a complex programmable logic device (CPLD), a baseboard management controller (BMC), CPU voltage regulators, CPU0, CPU1 and memories of the PSUs, that is, a processor information ROM (PIROM) of the PSU. The working principle is as follows: first, the BMC on the main board accesses the PIROM units in the PSU0 and PSU1 through the PMBUS bus, reads the product models of the PSU0 and PSU1 from the PIROM units, and determines the rated powers of the PSUs according to the product models. Then, the BMC performs encoding according to the rated powers to obtain the encoded signal A, and sends out the signal A to the CPLD via a general-purpose input/output (GPIO) interface. After receiving the signal, the CPLD sends a control signal B to control the preset conversion unit to output a corresponding voltage value. Next, the voltage value output by the conversion unit is supplied to the CPU voltage regulator, and the AD conversion is performed on the voltage value by the CPU voltage regulator to obtain a converted voltage value. The converted voltage value is given to a power control unit (PCU) inside the CPU via a serial voltage identification (SVID) bus. Finally, after the PCU receives the converted voltage value, the CPU will set the maximum operating frequency in overclocking according to amplitude of the converted voltage value, thereby realizing a matching between the maximum performance of the CPU and the maximum power supply capability of the PSU. That is, the embodiment of the present disclosure introduces a BMC identification mechanism, that is, the BMC identifies a model of the PSU and outputs an encoded signal, and the CPLD converts the encoded signal into a control signal, so that the power of the PSU corresponds to the voltage output of the conversion unit. By introducing a CPU operating frequency setting mechanism, the output voltage of the conversion unit corresponds to an operating frequency setting of the CPU. In the overclocking operation, the CPU will automatically set the maximum operating frequency in the overclocking state according to the rated power value of the current PSU, which can ensure realize an improvement in the maximum performance of the CPU, within the power supply capability of the PSU. In this way, the following problems can be effectively solved: when the main board is equipped with a high-specification CPU, in the overclocking operation state, there is a risk of triggering the PSU to be powered down or triggering the CPU to underclock, which affects the service processing of the end user; if a high-power PSU is selected so as to support the high-specification CPU and ensure overclocking performance, the overall cost of the product will increase although the performance requirements are met, so that the market competitiveness of the product is reduced. Based on the power specification of the PSU provided in the product and the specification of the CPU equipped, an upper limit of the operating frequency to which the CPU can be accelerated to, when the CPU in the overclocking performance, is determined according to the power output capability that can be provided by the PSU. Therefore, how high the power of the PSU can be, how high the operating frequency of the CPU can be. Therefore, the power supply capability of PSU can be fully utilized, and the performance of the CPU can be improved simultaneously without affecting services of the end user.

In addition, the solution provided in the present disclosure can also be used in power supply applications for high-density, whole cabinet server, storage and other products.

Figure 5:
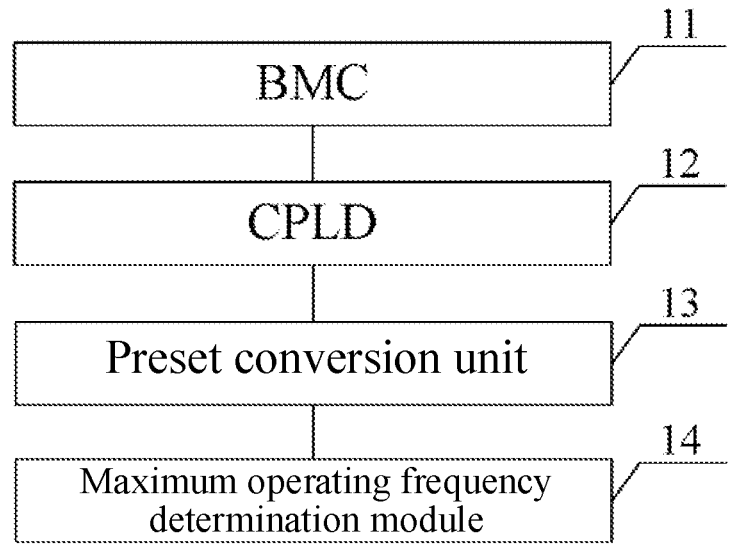
FIG. 5 is a schematic structural diagram of a CPU performance adjustment apparatus disclosed in the present disclosure.

With reference to FIG. 5, the present disclosure provides a central processing unit (CPU) performance adjustment apparatus, including:
- a baseboard management controller (BMC) 11, configured to determine a rated power of a PSU powering a current CPU;
- a complex programmable logic device (CPLD) 12, configured to output a control signal corresponding to the rated power;
- a preset conversion unit 13, configured to output a voltage value corresponding to the control signal; and
- a maximum operating frequency determination module 14, configured to determine, based on the voltage value and a first preset mapping relationship, a maximum operating frequency of the CPU in an overclocking state,
- where the first preset mapping relationship is a corresponding relationship between voltage ranges and maximum operating frequencies.

As can be seen, in the present disclosure, the rated power of the PSU for powering the current CPU is first determined by the BMC, then the control signal corresponding to the rated power is output by the CPLD, then the voltage value corresponding to the control signal is output by the preset conversion unit, and the maximum operating frequency of the CPU in the overclocking state is finally determined according to the voltage value and the first preset mapping relationship, where the first preset mapping relationship is a corresponding relationship between voltage ranges and maximum operating frequencies. That is to say, in the present disclosure, firstly, the rated power of the PSU for powering the current CPU is determined by the BMC, and a corresponding control signal is obtained by the CPLD through a conversion, the rated power of the PSU is made to be corresponding to a voltage output of the preset conversion unit, and finally the output voltage of the conversion unit is made to be corresponding to a setting of the maximum operating frequency of the CPU in the overclocking state. Thus, the maximum operating frequency of the CPU in the overclocking state corresponds to the rated power of the PSU, so as to avoid the problem of affecting the service processing of the end user caused because the CPU, when being in the overclocking operation state, triggers the overpower protection on the PSU or underclocking of the CPU, and avoid the cost rise.

In a specific implementation, the BMC 11 is further configured to read, by the BMC, a product model of the PSU powering the current CPU from a memory of the PSU; and determine the rated power of the PSU according to the product model.

Further, the BMC 11 is further configured to generate a target encoded signal corresponding to the rated power based on a second preset mapping relationship, and the second preset mapping relationship is a corresponding relationship between different rated powers and different encoded signals; and input the target encoded signal into the CPLD.

Accordingly, the CPLD is configured to output a control signal corresponding to the target encoded signal.

In a specific implementation, the CPLD is configured to determine the rated power corresponding to the target encoded signal, and output the control signal corresponding to the rated power according to a third preset mapping relationship, and the third preset mapping relationship is a corresponding relationship between different rated powers and different control signals.

The preset conversion unit is further configured to control the MOS in a target branch to turn on based on the control signal, and perform a voltage division on a reference voltage using a divider resistor on the target branch, to obtain a voltage value corresponding to the control signal; the reference voltage is a voltage converted from a supply voltage of the PSU, and resistance values of the divider resistors in different branches of the preset conversion unit are different, and the target branch is one branch of the preset conversion unit.

The maximum operating frequency determination module 14 further includes:
 a CPU voltage regulator, configured to perform an analogue-to-digital (AD) conversion on the voltage value to obtain a corresponding conversion value; and
 a CPU, configured to determine the maximum operating frequency of the CPU in the overclocking state according to the conversion value and a first preset mapping relationship.

Furthermore, the CPU is further configured to determine a voltage range to which the conversion value belongs so as to obtain a target voltage range; determine the maximum operating frequency corresponding to the target voltage range based on the first preset mapping relationship, and obtain the maximum operating frequency of the CPU in the overclocking state.

Figure 6:
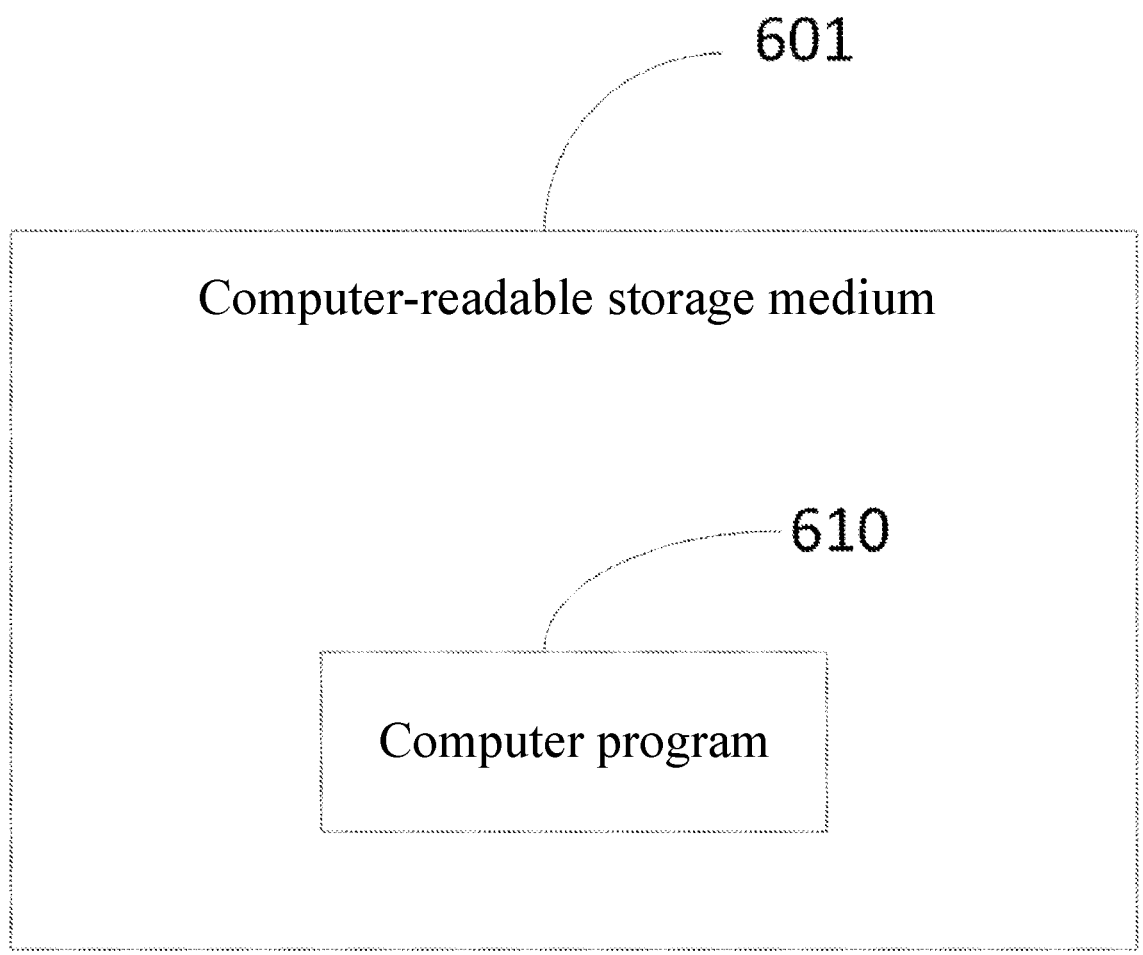
FIG. 6 is a schematic structural diagram of a computer-readable storage medium disclosed in the present disclosure.

Furthermore, FIG. 6 is a structural diagram of a computer-readable storage medium disclosed in the present disclosure. With reference to FIG. 6, an embodiment of the present disclosure further discloses a computer-readable storage medium 601 for storing a computer program 610 that, when being executed by a processor, implements the CPU performance adjustment method disclosed in the preceding embodiment.

With regard to the specific process of the above-mentioned CPU performance adjustment method, reference can be made to the corresponding contents disclosed in the foregoing embodiments, which will not be described in detail herein.

Various embodiments in the specification are described in a progressive manner, each embodiment focuses on the difference from other embodiments, and the same and similar parts of various embodiments can be referred to each other. Since the apparatus embodiment disclosed herein corresponds to the method embodiment, the description thereof is relatively simple, and for relevant details, please refer to the description of the method.

The steps of the methods or algorithms described in connection with the embodiments disclosed herein may be directly implemented by hardware, software modules executed by a processor, or a combination of both. Software modules can be placed in a random access memory (RAM), an internal memory, a read-only memory (ROM), an electrically programmable ROM, an electrically erasable programmable ROM, a register, a hard disk, a removable disk, CD-ROM, or any other storage medium known in the technical field.

The above is a detailed introduction to a CPU performance adjustment method, apparatus, and a medium provided by the present disclosure. Specific examples are used herein to illustrate the principle and implementation of the application. The description of the above embodiments is only used to help understanding the method of application and the core idea thereof. Moreover, for those skilled in the art, according to the idea of the application, there will be changes in the specific implementation and application scope. In summary, the contents of this specification should not be understood as limitations on the application.

The invention claimed is:
1. A central processing unit (CPU) performance adjustment method, comprising:
 determining, by a baseboard management controller (BMC), a rated power of a power supply unit (PSU) powering the current central processing unit (CPU);
 outputting, by a complex programmable logic device (CPLD), a control signal corresponding to the rated power;
 outputting, by a preset conversion unit, a voltage value corresponding to the control signal; and
 determining, based on the voltage value and a first preset mapping relationship, a maximum operating frequency of the CPU in an overclocking state,
 wherein the first preset mapping relationship is a corresponding relationship between voltage ranges and maximum operating frequencies;
 wherein the outputting, by the preset conversion unit, the voltage value corresponding to the control signal comprises:
  controlling, based on the control signal, a metal-oxide-semiconductor field-effect transistor (MOS) in a target branch of the preset conversion unit to turn on, and obtaining the voltage value corresponding to the control signal by performing a voltage division on a reference voltage using a divider resistor on the target branch,
wherein the reference voltage is a voltage converted from a supply voltage of the PSU, and resistance values of the divider resistors in different branches of the preset conversion unit are different, and the target branch is one branch of the preset conversion unit.

2. The central processing unit (CPU) performance adjustment method according to claim 1, wherein the determining, by the baseboard management controller (BMC), the rated power of the power supply unit (PSU) powering the current central processing unit (CPU) comprises:
reading, by the BMC, a product model of the PSU powering the current CPU from a memory of the PSU; and
determining the rated power of the PSU based on the product model.

3. The central processing unit (CPU) performance adjustment method according to claim 2, wherein the memory of the PSU is a processor information ROM (PIROM).

4. The central processing unit (CPU) performance adjustment method according to claim 3, wherein the reading, by the BMC, the product model of the PSU powering the current CPU from the memory of the PSU comprises accessing data in the PIROM of the PSU via a power management bus (PMBUS).

5. The central processing unit (CPU) performance adjustment method according to claim 1, further comprising:
generating, based on a second preset mapping relationship, a target encoded signal corresponding to the rated power by the BMC, wherein the second preset mapping relationship is a corresponding relationship between different rated powers and different encoded signals;
the outputting, by the complex programmable logic device (CPLD), the control signal corresponding to the rated power comprises:
inputting the target encoded signal into the CPLD, and outputting the control signal corresponding to the target encoded signal by the CPLD.

6. The central processing unit (CPU) performance adjustment method according to claim 5, wherein the outputting, by the complex programmable logic device (CPLD), the control signal corresponding to the rated power comprises:
determining, by the CPLD, the rated power corresponding to the target encoded signal, and outputting the control signal corresponding to the rated power based on a third preset mapping relationship,
wherein the third preset mapping relationship is a corresponding relationship between different rated powers and different control signals.

7. The central processing unit (CPU) performance adjustment method according to claim 5, wherein the outputting, by the complex programmable logic device (CPLD), the control signal corresponding to the rated power comprises:
outputting the control signal corresponding to the target encoded signal based on a fourth preset mapping relationship, wherein the fourth preset mapping relationship is a corresponding relationship between different encoded signals and different control signals.

8. The central processing unit (CPU) performance adjustment method according to claim 1, wherein the determining, based on the voltage value and the first preset mapping relationship, the maximum operating frequency of the CPU in the overclocking state comprises:
performing an analogue-to-digital (AD) conversion on the voltage value to obtain a corresponding conversion value; and
determining the maximum operating frequency of the CPU in the overclocking state based on the conversion value and the first preset mapping relationship.

9. The central processing unit (CPU) performance adjustment method according to claim 8, wherein the determining the maximum operating frequency of the CPU in the overclocking state based on the conversion value and the first preset mapping relationship comprises:
obtaining a target voltage range by determining the voltage range to which the conversion value belongs; and
obtaining the maximum operating frequency of the CPU in the overclocking state by determining the maximum operating frequency corresponding to the target voltage range based on the first preset mapping relationship.

10. A central processing unit (CPU) performance adjustment apparatus, comprising:
a baseboard management controller (BMC), configured to determine a rated power of a power supply unit (PSU) powering the current central processing unit (CPU);
a complex programmable logic device (CPLD), configured to output a control signal corresponding to the rated power;
a preset conversion circuit, configured to output a voltage value corresponding to the control signal; and
a maximum operating frequency determination circuit, configured to determine, based on the voltage value and a first preset mapping relationship, a maximum operating frequency of the CPU in an overclocking state,
wherein the first preset mapping relationship is a corresponding relationship between voltage ranges and maximum operating frequencies;
wherein the preset conversion circuit is configured to:
control, based on the control signal, a metal-oxide-semiconductor field-effect transistor (MOS) in a target branch of the preset conversion circuit to turn on, and obtain the voltage value corresponding to the control signal by performing a voltage division on a reference voltage using a divider resistor on the target branch,
wherein the reference voltage is a voltage converted from a supply voltage of the PSU, and resistance values of the divider resistors in different branches of the preset conversion circuit are different, and the target branch is one branch of the preset conversion circuit.

11. The central processing unit (CPU) performance adjustment apparatus according to claim 10, wherein the maximum operating frequency determination circuit comprises:
a CPU voltage regulator, configured to perform an analogue-to-digital (AD) conversion on the voltage value to obtain a corresponding conversion value; and
the central processing unit (CPU), configured to determine the maximum operating frequency of the CPU in the overclocking state based on the conversion value and the first preset mapping relationship.

12. The central processing unit (CPU) performance adjustment apparatus according to claim 10, wherein the BMC is further configured to: generate a target encoded signal corresponding to the rated power based on a second preset mapping relationship, wherein the second preset mapping relationship is a corresponding relationship between different rated powers and different encoded signals; and input the target encoded signal into the CPLD;

the CPLD is configured to output the control signal corresponding to the target encoded signal.

13. The central processing unit (CPU) performance adjustment apparatus according to claim 12, wherein the CPLD is further configured to determine the rated power corresponding to the target encoded signal, and output the control signal corresponding to the rated power based on a third preset mapping relationship,
wherein the third preset mapping relationship is a corresponding relationship between different rated powers and different control signals.

14. The central processing unit (CPU) performance adjustment apparatus according to claim 12, wherein the CPLD is further configured to output the control signal corresponding to the target encoded signal based on a fourth preset mapping relationship, wherein the fourth preset mapping relationship is a corresponding relationship between different encoded signals and different control signals.

15. The central processing unit (CPU) performance adjustment apparatus according to claim 10, the BMC is further configured to read a product model of the PSU powering the current CPU from a memory of the PSU; and determine the rated power of the PSU based on the product model.

16. The central processing unit (CPU) performance adjustment apparatus according to claim 15, wherein the memory of the PSU is a processor information ROM (PIROM).

17. The central processing unit (CPU) performance adjustment apparatus according to claim 16, wherein the BMC is configured to access data in the PIROM of the PSU via a power management bus (PMBUS).

18. A non-transient computer-readable storage medium for storing a computer program that, when executed by a processor, implements operations of:
determining, by a baseboard management controller (BMC), a rated power of a power supply unit (PSU) powering a current central processing unit (CPU);
outputting, by a complex programmable logic device (CPLD), a control signal corresponding to the rated power;
outputting, by a preset conversion unit, a voltage value corresponding to the control signal; and
determining, based on the voltage value and a first preset mapping relationship, a maximum operating frequency of the CPU in an overclocking state,
wherein the first preset mapping relationship is a corresponding relationship between voltage ranges and maximum operating frequencies;
wherein the outputting, by the preset conversion unit, the voltage value corresponding to the control signal comprises:
controlling, based on the control signal, a metal-oxide-semiconductor field-effect transistor (MOS) in a target branch of the preset conversion unit to turn on, and obtaining the voltage value corresponding to the control signal by performing a voltage division on a reference voltage using a divider resistor on the target branch,
wherein the reference voltage is a voltage converted from a supply voltage of the PSU, and resistance values of the divider resistors in different branches of the preset conversion unit are different, and the target branch is one branch of the preset conversion unit.

* * * * *